Nov. 8, 1938.  O. B. OLSON  2,136,311

AUTOMOBILE SPRING WHEEL

Filed July 22, 1936  2 Sheets-Sheet 1

O. B. Olson
INVENTOR

BY Victor J. Evans & Co.
ATTORNEYS

Nov. 8, 1938.  O. B. OLSON  2,136,311
AUTOMOBILE SPRING WHEEL
Filed July 22, 1936   2 Sheets-Sheet 2
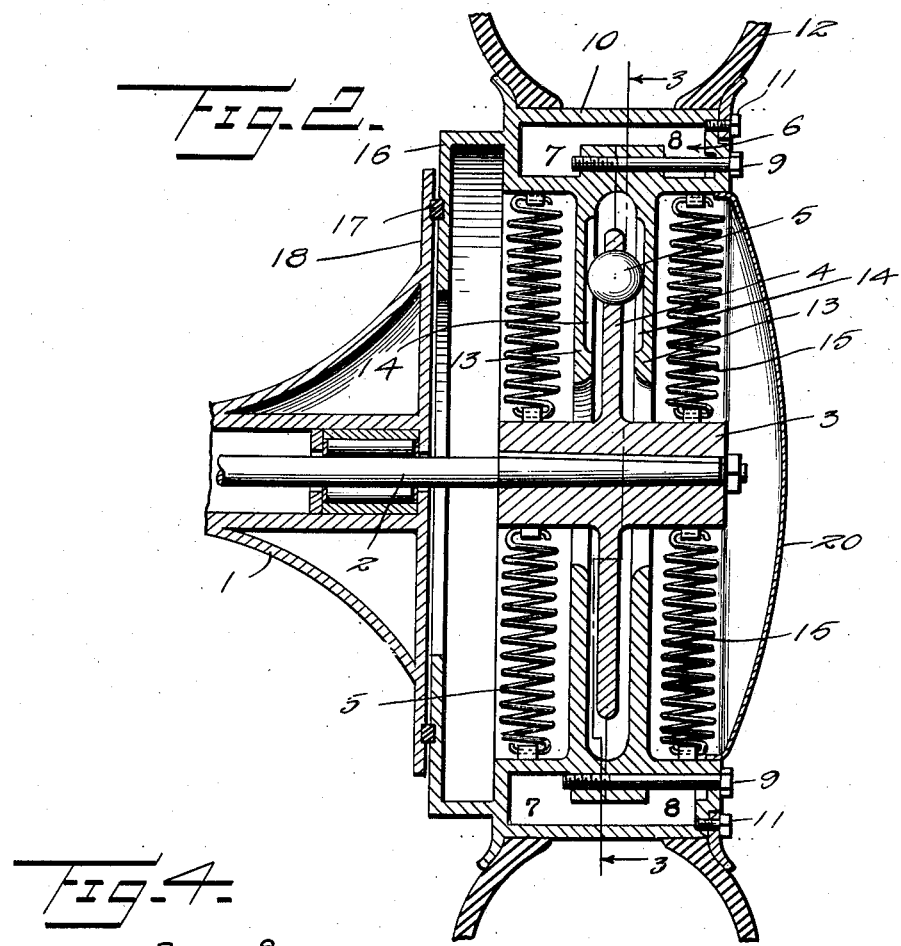
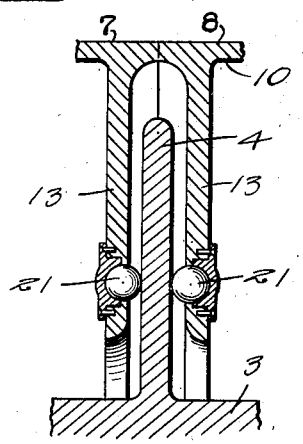
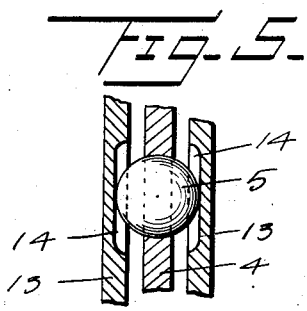
O. B. Olson
INVENTOR
BY Victor J. Evans & Co.
ATTORNEYS Patented Nov. 8, 1938

2,136,311

UNITED STATES PATENT OFFICE 2,136,311

AUTOMOBILE SPRING WHEEL

Oscar B. Olson, St. James, Minn.

Application July 22, 1936, Serial No. 91,997

1 Claim. (Cl. 152—28)

This invention relates to spring wheels for motor vehicles and has for the primary object the provision of a device of this character which will be efficient in the absorbing of road shocks and preventing said shocks from being transmitted to the vehicle, consequently materially increasing the riding comforts of the vehicle and the life of said vehicle.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating a spring wheel constructed in accordance with my invention.

Figure 2 is a sectional view taken on the line 2—2 of Figure 1.

Figure 4 is a sectional view taken on the line 4—4 of Figure 3.

Figure 5 is an enlarged fragmentary sectional view illustrating a means for limiting the movement of the felly of the wheel relative to the hub.

Figure 1:
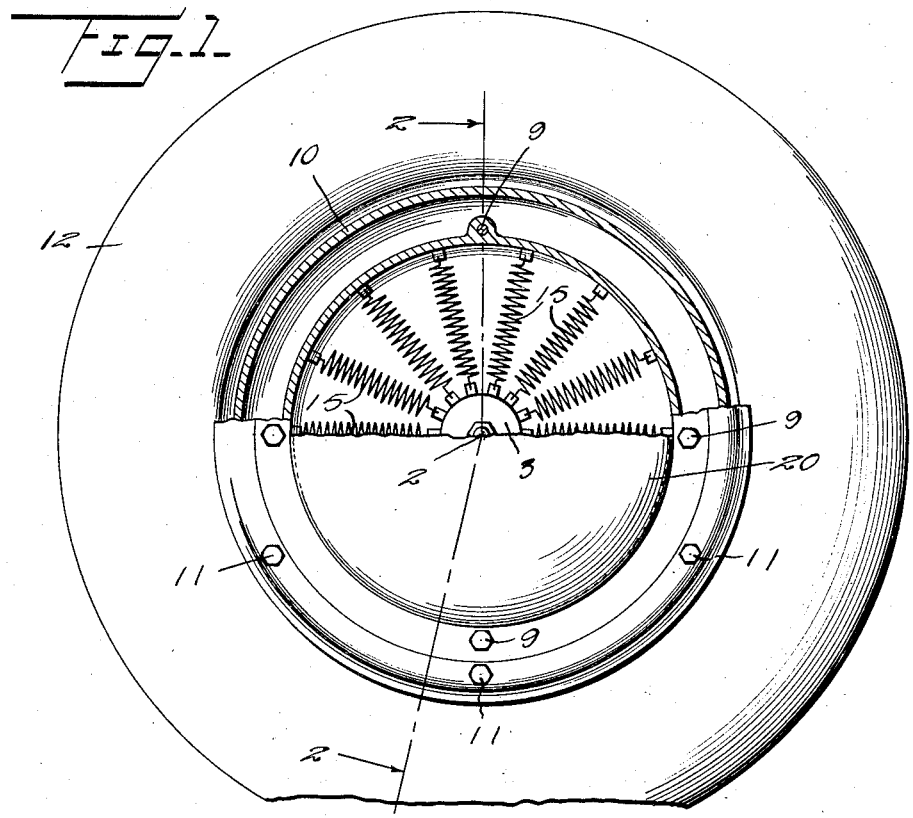
Figure 3:
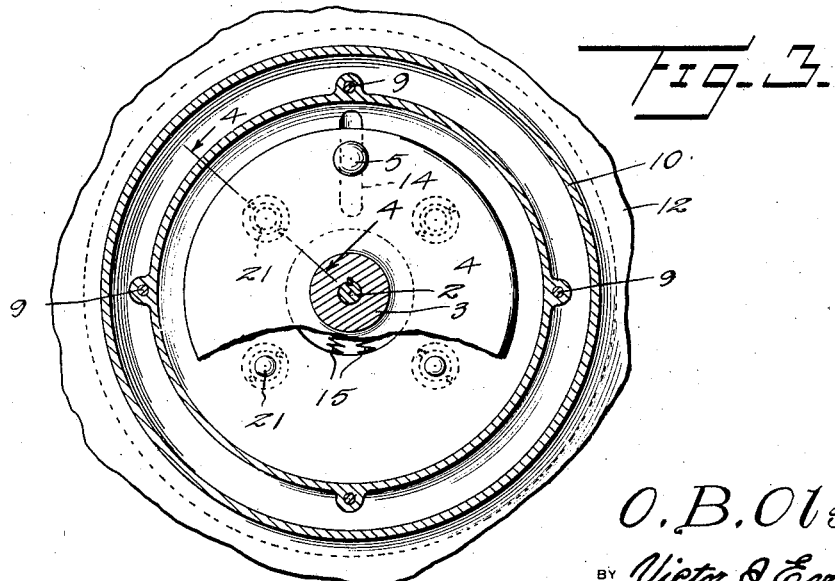
Figure 3 is a sectional view taken on the line 3—3 of Figure 2.

Referring in detail to the drawings, the numeral 1 indicates an axle housing of a motor vehicle and 2 the power axle to which is secured the hub 3. Formed intermediate the ends of the hub 3 is a circular disc 4 having provided therein an opening acting as a seat for a ball 5. The felly of the wheel is indicated in entirety by the character 6 and is composed of companion annular sections 7 and 8 detachably connected by stud bolts 9. A sectional rim 10 is mounted on the felly 6 and one section thereof forms an integral part of the section 7 of the felly. The integral section of the rim, that is, the section which is formed integrally with the section 7 of the felly has detachably connected thereto by stud bolts 11 the other section of the rim. Therefore, it will be seen that a tire 12 can be easily mounted on or removed from the rim.

Formed integrally with the sections 7 and 8 of the felly are plates 13 defining a space therebetween to freely receive the disc 4. Opposing faces of the plates 13 have grooves 14 to loosely receive the ball 5 which will permit the hub to have a limited rotation relative to the felly. Coil springs 15 are secured to the sections 7 and 8 of the felly and to the hub 3. The number and size of springs may vary in accordance with the loads the wheel is required to carry.

Formed integrally with the felly is a brake drum 16 having a groove to receive a gasket 17 fitting in a like groove formed in a flange 18 of the axle housing 1. The gasket is to exclude dirt from the interior of the wheel. A removable cap 20 closes the front of the wheel.

In use, the hub is suspended in the felly by the springs and when power is delivered to the hub by the axle 2 certain of the springs will expand and others contract, allowing the hub to move off center having a tendency in aiding in rotating the wheel. The springs also will deliver the driving force from the hub to the felly and to prevent said springs from being severely twisted or broken the ball 5 is provided between the disc 4 and the plates 13.

The plates 13 carry ball bearings 21 which ride against the opposite faces of the disc 4 for the purpose of keeping the felly in alignment with the hub still permitting the hub and felly to move relative to each other so that the springs may absorb shocks and jars when the wheel contacts an obstacle or passes from a high place to a low place.

Having described the invention, I claim:

A spring wheel comprising a hub, a disc fixed to said hub, a felly loosely disposed about said disc, a pair of spaced apart annular plates fixed to said felly and disposed on opposite sides of said disc, contractile springs secured to said felly and said hub on opposite sides of said plates, said springs resiliently supporting said felly about said hub, bearing elements carried by said plates engaging opposite sides of said disc to movably hold said disc between said plates, each of said plates having a guide groove on the side thereof confronting said disc, and a ball carried by said disc engaging in said guide grooves to hold said plates against rotary movement relative to said disc while permitting movement of said plates in a direction at right angles to the axis of said hub.

OSCAR B. OLSON.